April 11, 1939.  O. E. STAPLES ET AL  2,154,056
HOBBING MACHINE
Filed March 10, 1938  3 Sheets-Sheet 1

INVENTOR.
BY  OTIS E. STAPLES
THEODORE F. CARLIN
Kwis Hudson & Kent
ATTORNEYS

April 11, 1939.  O. E. STAPLES ET AL  2,154,056
HOBBING MACHINE
Filed March 10, 1938  3 Sheets—Sheet 2

INVENTOR.
OTIS E. STAPLES
THEODORE F. CARLIN
BY Kurio Hudson Kent
ATTORNEYS

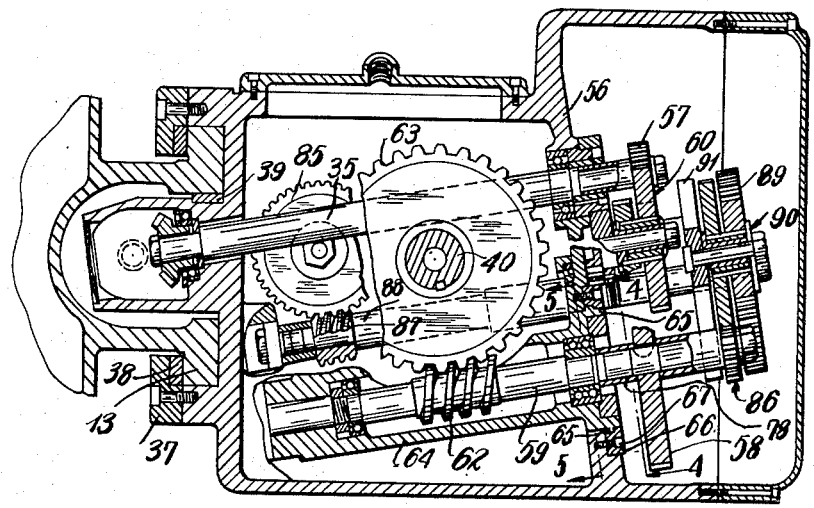

Patented Apr. 11, 1939

2,154,056

UNITED STATES PATENT OFFICE 2,154,056

HOBBING MACHINE

Otis E. Staples and Theodore F. Carlin, Cleveland, Ohio, assignors to The Cleveland Hobbing Machine Company, Cleveland, Ohio, a corporation of Ohio Application March 10, 1938, Serial No. 195,062

1 Claim. (Cl. 90—4)

The present invention relates to machine tools, especially hobbing machines, and more particularly to the drive therefor.

An object of the present invention is the provision of novel and improved means for supporting and adjusting the worm of a worm and worm wheel drive.

Another object of the present invention is the provision of novel and improved means for supporting and adjusting the worm of a hobbing machine having a worm and worm wheel drive.

Another object of the present invention is the provision of a novel and improved hobbing machine comprising a worm and worm wheel drive and including means for supporting and adjusting the worm thereof which will securely hold the worm in adjusted position but which can be readily manipulated to take up wear, etc.

The present invention resides in certain details of construction and combinations and arrangements of parts, and further objects and advantages thereof will be apparent to those skilled in the art to which the invention relates from the following description of the preferred embodiment thereof, described with reference to the accompanying drawings forming a part of this specification in which similar reference characters designate corresponding parts throughout the several views and in which—

Fig. 3 is a section on the line 3—3 of Fig. 2;

Fig. 4 is a section on the line 4—4 of Fig. 3;

Fig. 5 is a section on the line 5—5 of Fig. 3; and

Fig. 6 is a wiring diagram of the electrical circuits of the machine.

Figure 1:
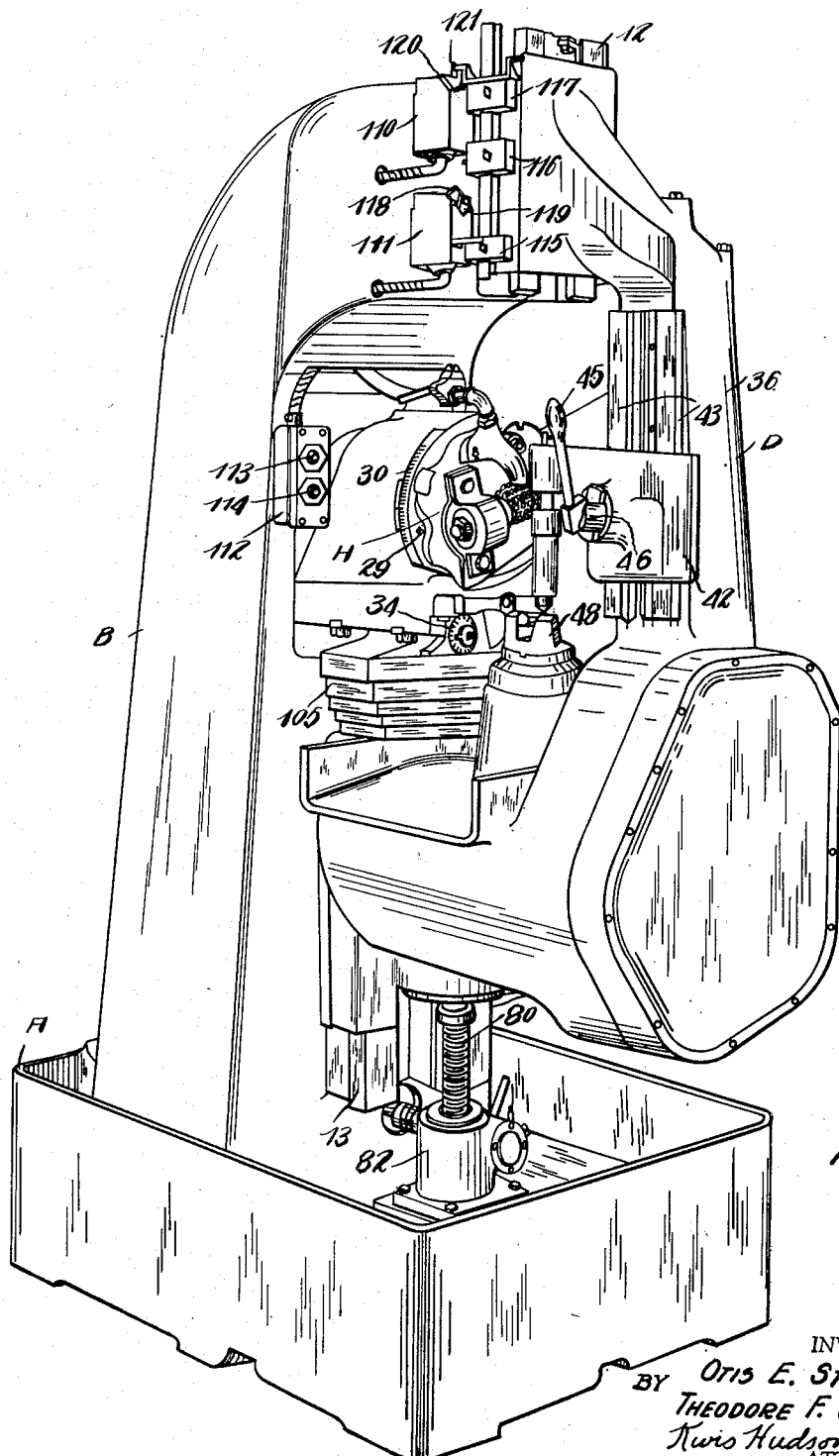
Fig. 1 is a perspective view of a hobbing machine embodying the present invention.

Although the invention is susceptible of embodiment in various constructions, it is herein shown and described as embodied in a single spindle hobbing machine of general vertical construction. The bed of the machine designated generally by the reference character A and which serves as a sump for the cutting fluid, etc., is rectangular which permits a number of machines to be ganged together, synchronized, and taken care of by a single operator. The frame of the machine designated generally by the reference character B is of hollow construction to provide maximum rigidity and minimum weight and is bolted to the bed A.

The tool head designated generally by the reference character C comprises a member 10 slidably supported on horizontal ways 11 formed integral with the frame B and located intermediate vertical ways 12 and 13 upon which the work head, designated generally by the reference character D, hereinafter more specifically referred to, is slidably supported. A tool spindle 15, which carries the hob, is rotatably supported in a member 16 through the medium of antifriction bearings, which member 16 is rotatably supported by the member 10 coaxially with the main drive shaft 17 of the machine. The tool spindle 15 is operatively connected to the drive shaft 17 through the medium of mitre gears 18 and 19, the former of which is provided with an elongated hub splined to the front end of the drive shaft 17 and rotatably supported in a rearwardly extending boss 20 formed integral with the member 16. The mitre gear 19 is secured to the lower end of a short shaft 21 rotatably supported in the member 16, upon the upper end of which is formed a spiral pinion 22 continuously in mesh with a spiral gear 23 keyed to the tool spindle 15. The hob designated generally by the reference character H is carried by a hob arbor 25 fixed at its upper end to the tool spindle 15, while the lower end thereof is rotatably supported in a bracket 26 adjustably secured to the member 16. The upper end of the tool spindle 15 is provided with a fly wheel 27 in the usual manner.

The member 16 is rotatably supported by the member 10 through the medium of a boss 28 which engages within a cylindrical aperture formed in the front wall of the member 10. Bolts 29, the heads of which engage within a circular T-slot 30, provide means for securing the member 16 to the member 10 in any adjusted angular position. A vernier scale 30 on the side of the member 10 permits the hob to be quickly and accurately set to any desired angle. The tool head C may be adjusted along the ways 11 to move the hob toward or away from the work through the medium of a short shaft 31 rotatably supported in the frame B and provided with a worm 32 fixed thereto in any convenient manner. The worm 32 is continuously in mesh with a rack 33 secured to the underside of the member 10 from which construction it will be apparent that upon rotation of the shaft 31 the tool head will be moved along the ways 11, either towards or away from the work, depending upon the direction of rotation of the shaft 31. The forward end of the shaft 31 is made square for the reception of a wrench or the like employed in turning the same and a graduated dial 34 fixed thereto facilitates setting and adjusting the hob. The tool head C, that is the member 10 thereof, is adapted to be clamped to the ways 11 in any adjusted position through the medium of bolts provided for that purpose. The member 10 has a telescopic connection with a boss-like member 35 fixed to the frame B, which connection prevents the entrance of chips, etc., into the interior of the tool head while permitting the same to be readily adjusted along the ways 11.

The work head designated generally by the reference character D comprises a member 36 slidably supported on the vertically spaced ways 12 and 13 previously referred to formed on the frame B at the top and bottom thereof respectively. The work head, that is the frame 36 thereof, is held in engagement with the lower ways 13 by members 37 bolted to the rear side of the member 36 and projecting to the rear of the overhanging portions of the ways 13. Adjustable gibs 38 interposed between the members 37 and the ways 13 are provided for the purpose of taking up wear, etc., and an adjustable gib 39 interposed between a rib formed on the rear of the member 36 and the right-hand way prevents side movement of the work head D. The upper end of the work head D is maintained in engagement with the upper ways 12 in a manner similar to that in which the lower part of the work head is maintained in engagement with the lower ways 13 and will not be specifically described.

The work is adapted to be supported between a chuck fixed to the upper end of the work spindle 40 and a tail center 41 of a tail stock 42 slidably supported on ways 43 formed integral with the work head frame or member 36. The tail stock 42 is adapted to be moved along the ways 43 and clamped in any position therealong by a manually operable lever 45 pivotally connected in the outer end of a member 46 rotatably supported in the tail stock 42. The inner end of the shaft 46 is provided with a gear, not shown, which is continuously in mesh with a rack 47 secured to the work head frame 36 adjacent the outer way 43. The lever 45 is rotatable about an axis parallel with the ways 43 to clamp and unclamp the tail stock, and about an axis normal to the ways 43 to move the tail stock therealong.

The work spindle 40 is rotatably supported in the work head frame by antifriction bearings and is driven from the main drive shaft 17 of the machine through a bevel gear 48 rotatably supported in a suitable aperture formed in a partition in the member 35 and splined to the shaft 17. The gear 48, or rather the hub thereof, forms a bearing for the shaft 17 and the teeth thereof are continuously in mesh with a bevel gear 50 fixed to the upper end of a vertically positioned spline shaft 51 the upper end of which is rotatably supported in the member 35. The lower end of the spline shaft 51 has a splined connection with a bevel gear 52 provided with an elongated hub through the medium of which it is rotatably supported in a rearwardly extending boss 53 formed integral with the work head frame 36. The bevel gear 52 is continuously in mesh with a bevel gear 54 fixed to the rear end of a horizontal shaft 55, the rear end of which shaft is rotatably supported by a suitable antifriction bearing in the rear part of the work head frame or member 36. The front end of the shaft 55 is rotatably supported in the partition 56 in the work head frame and carries a gear 57 keyed thereto which is operatively connected to a gear 58 fixed to a horizontal shaft 59 through the medium of change gears designated generally as 60 continuously in mesh with the gears 57 and 58. The change gears 60 are keyed together and are rotatably supported on a sleeve carried by a bolt which in turn is adjustably supported in a T-slot in a bracket rotatably supported coaxially with the shaft 55 and adapted to be secured in any adjusted position by suitable means, not shown. The shaft 59 is operatively connected to the work spindle 40 through the medium of a worm and worm wheel drive, the worm 62 of which is formed integral with the shaft 59 while the worm wheel 63 is keyed to the work spindle 40.

According to the provisions of the present invention, means is provided for adjusting the worm 62 relative to the worm wheel 63 for the purpose of eliminating lost motion and taking up wear therebetween. For this purpose the shaft 59 is rotatably supported in a cradle 64 which in turn is rotatably supported in a work head frame 36 for rotation about an axis offset from the axis of the shaft 59. The rear end of the cradle 64 extends into a suitable aperture formed in a work head frame 36 and the front end thereof is rotatably supported in a suitable aperture formed in the partition 56. The forward end of the cradle 64 which is enlarged, see Fig. 3, is provided with an annular flange 65 through the medium of which the cradle is adapted to be clamped in any adjustable angular position by a clamp ring 66 bolted through the medium of bolts 67 to the forward face of the partition 56. To facilitate adjustment of the cradle 64, the forward face thereof is provided with apertures 71 adapted to receive a spanner wrench. A spacer collar 78 is positioned between the gear 58 and the inside race of the antifriction bearing which supports the forward end of the shaft 59. From the foregoing description it will be readily apparent that the worm 62 may be adjusted relative to the worm wheel 63 by merely loosening the bolts 67 which hold the clamp ring, and rotating the cradle 64 the required amount, after which the bolts 67 are again tightened to lock the cradle in its adjusted position.

In the embodiment shown, the work head D is moved in an upward direction to carry the work past the hob by a lead screw 80 the upper end of which is rotatably supported in the work head frame 36 while the lower end thereof engages a nut 81 rotatably supported in a bracket 82 bolted or otherwise secured to the base A in some convenient manner. Thrust bearings interposed between a shoulder on the upper end of the lead screw formed by a reduced section 83 and the work head frame 36, and the lower side of the nut 81 and the bracket 82 are provided for taking the load while permitting free rotation of both the lead screw 80 and the nut 81. The lead screw 80 is adapted to be rotated in timed relation to the rotation of the work and tool spindles to effect the feeding movement through the medium of a worm gear 85 keyed to the upper end thereof and operatively connected to a gear 86 keyed to the forward end of the shaft 59 through the medium of a worm 87 fixed to the rear end of a shaft 88 rotatably supported in the work head frame, a gear 89 fixed to the forward end of said shaft 88, and change gears designated generally as 90. The change gears 90 are rotatably supported on a sleeve which in turn is supported on a bolt adjustably secured in a slot formed in a sector 91. The sector 91 is rotatably supported for annular adjustment coaxially with the shaft 88 and is adapted to be secured in any adjusted position in a conventional manner.

The main drive shaft 17 of the machine is operatively connected to an electric motor 93 supported on an adjustable platform located in a recess in the frame B by a flexible drive connection designated generally by the reference character 94. The rear end of the drive shaft 17 is rotatably supported in a boss 95 formed integral with the frame B and the front end thereof is rotatably supported in the member 35 through the medium of a bevel gear 48 splined thereto. From the foregoing description it will be seen that upon rotation of the motor 93 in a predetermined direction the spindles 15 and 40 and the lead screw 80 will be rotated in timed relation.

Figure 2:
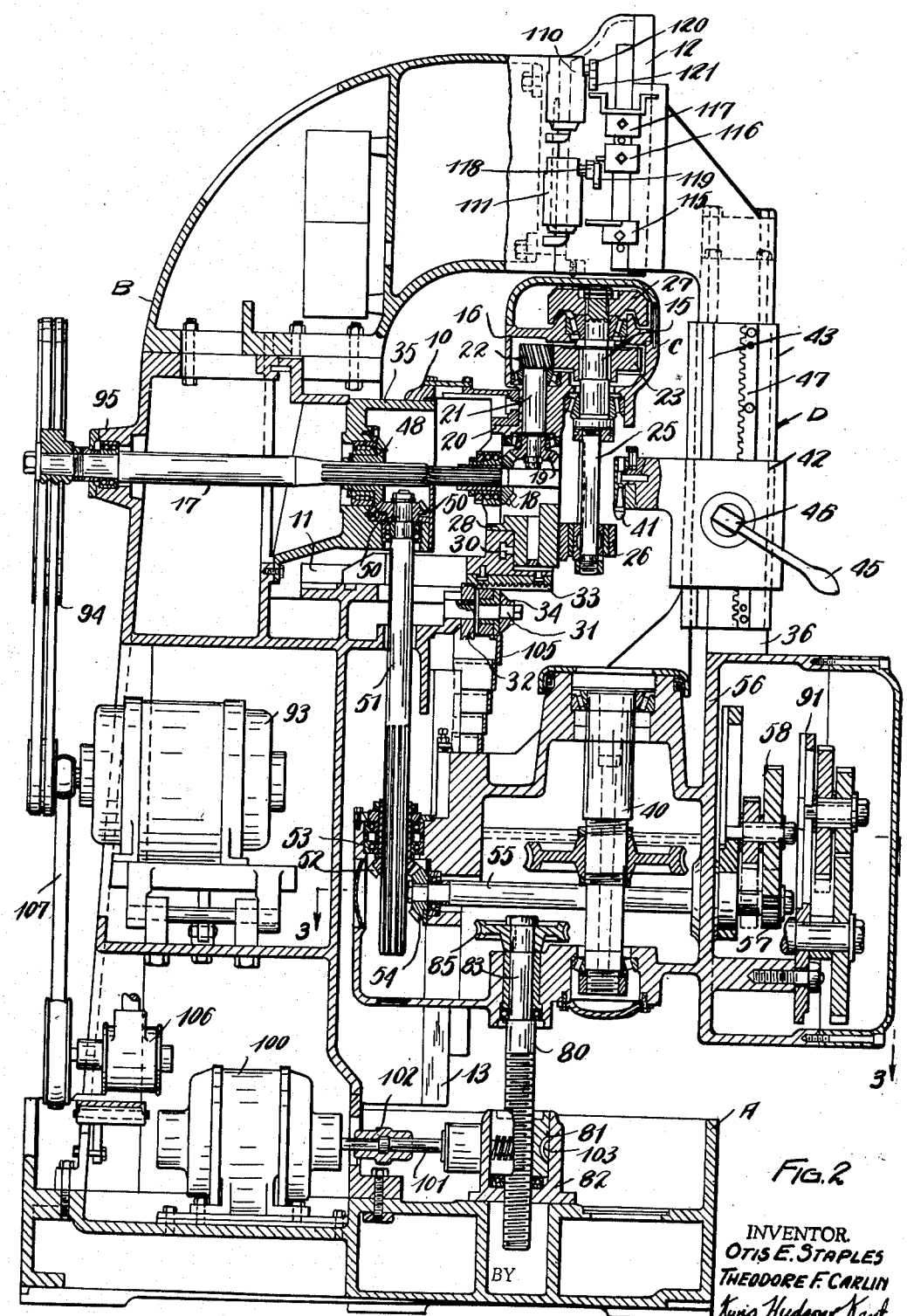
Fig. 2 is a vertical section through the machine shown in Fig. 1 on the center line with portions in elevation with the work head lowered, the hob head rotated to a vertical position, and the hob and work arbor omitted.

A rapid traverse movement is adapted to be imparted to the work head D to bring the work up to the hob and to return the work head to its starting position by a reversible motor 100 supported on the bed A within the frame B and operatively connected to the nut 81 by a worm and worm wheel drive the worm of which is keyed to the forward end of a shaft 101 rotatably supported in the bracket 82 and connected to the armature of the motor 100 by a suitable coupling 102. The worm wheel of the drive referred to is formed about the periphery of the nut 81 and is designated 103, see Fig. 2. The worm and worm wheel are of the self-locking type which prevents rotation of the nut 81 relative to the lead screw 80 while the motor 100 is at rest, which is during the cutting operation.

The work head frame 36 is divided into two compartments by the partition 56 both of which compartments are adapted to be filled with oil to a suitable level to provide lubrication for the various parts housed therein. A telescopic guard 105 is employed over the lower ways 13 to prevent the accumulation of chips, etc., thereon. Cutting fluid is supplied to the tool by the pump 106 located in the lower part of the frame B and driven from the motor 93 through a flexible drive connection 107. The pump 106 operates only during the cutting operation since the motor 93 is operated at this time only, the pump 106, like the motor 93, being supported on an adjustable base which provides an adjustment for the drive connection.

Preferably the motors 93 and 100 are of the three-phase alternating current type, and the motor 100 is of the reversible type. The starting and stopping of the motors is controlled by upper and lower limit switches 110 and 111, respectively, of conventional construction, and a start-stop push button switch 112, also of conventional construction, the start and stop buttons 113 and 114 respectively of which are provided with ferrules adapted to limit the movement thereof. The start push button 113 is normally in the out position, that is, the position shown in the wiring diagram, but may be set in a neutral position, that is, in an intermediate position by the ferrule associated therewith, and the stop button 114, which is normally closed, may be set in open position by the ferrule associated therewith. The limit switches 110 and 111 are actuated and controlled by adjustable stops 115, 116 and 117 movably connected to the upper end of the work head D. The stops 115 and 116 engage the arms 118 and 119 of a bell crank lever connected to the operating shaft of the limit switch 111 to actuate the latter, and the stop 117 engages arms 120 and 121 of a bell crank lever fixed to the operating shaft of the lower limit switch 110.

The motor 93 is adapted to be connected to and disconnected from the supply lines $L^1$, $L^2$, and $L^3$ through the medium of a solenoid operated circuit breaker panel 122. The operating solenoid and holding-in circuits are indicated by the reference characters $e$ and $e'$ respectively. The motor 100 is adapted to be connected to and disconnected from the supply lines through a reversible circuit breaker panel 123, the operating solenoids and their respective holding-in circuits of which are designated by the reference characters $f$, $f'$, $g$ and $g'$. The solenoid $f$ closes the circuit to the motor 100 to operate the same in a direction to raise the work head D and the solenoid $g$ is adapted to close the circuit to the motor 100 to operate the same in a direction to lower the work head. In the wiring diagram the leads to the motor 93 are designated by the reference characters $T^1$, $T^2$, and $T^3$, and the leads to the motor 100 are designated by the reference characters $T^4$, $T^5$, and $T^6$. The reference character 124 designates a conventional contact relay. The control panels 122 and 123 are preferably enclosed within the head of the frame B.

The operation of the machine is as follows:
With the machine at rest and the work head in its down position, the electrical circuits are as shown in the wiring diagram. A work blank is secured in position between the work spindle chuck and the tail center while the work head is in its up position, after which the start button 113 is pressed to close the circuit to the contact relay 124 which, in turn, closes the circuit to the solenoid $f$, starting the motor 100. The motor 100 rotates the nut 81 at a comparatively high speed to rapidly bring the work down to the hob. When the start button 113 is released after it has been pressed by the operator to start the machine, the relay 124 is maintained closed through the holding-in circuit $f'$ which has been energized in the interim. Thereafter the relay 124 maintains its own circuit. The stop 117 is so positioned that it engages the upstanding arm 120 of the limit switch 110 and moves the contact arm thereof to its lower position just prior to the engagement of the work with the hob. This movement of the contact arm of the limit switch 110 opens the circuit to the solenoid $f$ and closes the circuit to the solenoid $e$, which in turn disconnects the motor 100 from the supply lines and connects the motor 93 thereto, thus stopping the motor 100 and starting the motor 93. The holding-in circuit $e'$ maintains the circuit to the motor 93 until the cutting operation has been completed, at which time the stop 115 engages the arm 118 and actuates the upper limit switch 111, opening the circuit to the motor 93, and resetting the circuit to the solenoid $g$, so that the motor 100 will be energized to impart a rapid return movement to the work head when the start button 113 is again pressed.

While the work head D is in its up position, the finished blank is removed, after which the start button 113 is again pressed, causing the motor 100 to rotate in the reverse direction and lower the work head. As the work head D moves down the stop 117 engages the arm 120 of the upper limit switch 110 and returns the same to its initial or starting position. As the work head approaches its lower limit of movement, the stop 116 engages the lever 119 actuating the limit switch 111 to return it to its starting or initial position. This opens the circuit to the motor 100 and stops the upward movement of the work head. The machine is now in the position for the operating cycle to be repeated. The machine may be stopped at any time during the cycle of operation by pressing the stop button 114. After the stop button 114 has been pressed, the machine can again be started only by pressing the start button 113. The stop button 114 can be set in an open position by turning the ferrule associated therewith. In this event the machine cannot be operated until the ferrule is again returned to release the stop button. If the start button 113 is set in a neutral position by means of the ferrule associated therewith, the motor 93 will not be energized when the motor 100 is stopped at the end of the transverse movement which brings the work up to the hob. This is advantageous in setting up the machine, etc. The direction of rotation of the hob relative to the feed is such that each tooth of the hob cuts from the outside of the blank towards the center with the heavy part of the cut occurring as the tooth enters the work.

From the foregoing description of the preferred embodiment of the invention it will be apparent that the objects of the invention heretofore enumerated have been accomplished and that improved means has been provided for supporting the worm of a worm and worm wheel drive in a machine tool, especially a hobbing machine, which means securely locks the worm in any adjusted position while permitting ready adjustment thereof. While the preferred embodiment of the invention has been illustrated and described in considerable detail, the invention is not limited to the particular construction shown which may be varied within the scope thereof, and it is the intention to cover hereby any and all variations, adaptations or uses thereof that come within the knowledge or practice of those skilled in the art to which the invention relates and within the spirit and scope of the appended claim.

Having thus described our invention, we claim:

In a hobbing machine, the combination of a frame, a tool spindle rotatably supported by said frame, a work spindle rotatably supported by said frame, means for producing relative feed movement between said spindles, a shaft, means for rotating said spindles in timed relation, said last mentioned means comprising a positive drive connecting said spindles and including a worm wheel fixed to said work spindle and a worm fixed to said shaft and in mesh with said worm wheel, a cradle member for supporting said worm, means for rotatably supporting both ends of said shaft in said cradle member, means for rotatably supporting said cradle member in said frame for adjustment about an axis eccentric to the axis of rotation of said shaft, said cradle member having a flange adjacent to one end thereof, and a clamp ring surrounding said flange and cooperating therewith to fixedly secure said cradle member in said frame.

OTIS E. STAPLES.
THEODORE F. CARLIN.